United States Patent
Hruzek et al.

(10) Patent No.: US 11,061,417 B2
(45) Date of Patent: Jul. 13, 2021

(54) SELECTABLE-RATE BOTTOM PURGE APPARATUS AND METHODS

(71) Applicant: Applied Materials, Inc., Santa Clara, CA (US)

(72) Inventors: Dean C. Hruzek, Cedar Park, TX (US); Paul B. Reuter, Austin, TX (US); Devendra C. Holeyannavar, Bangalore (IN); Srinivas P. Gopalakrishna, Bangalore (IN); Lakshmikantha K. Shirahatti, Gadag (IN); Babu Chinnasamy, Bangalore (IN); Douglas B. Baumgarten, Round Rock, TX (US)

(73) Assignee: Applied Materials, Inc., Santa Clara, CA (US)

( * ) Notice: Subject to any disclaimer, the term of this patent is extended or adjusted under 35 U.S.C. 154(b) by 167 days.

(21) Appl. No.: 16/225,427

(22) Filed: Dec. 19, 2018

(65) Prior Publication Data
US 2020/0201363 A1    Jun. 25, 2020

(51) Int. Cl.
*G05D 7/06* (2006.01)
*G01F 15/00* (2006.01)
(Continued)

(52) U.S. Cl.
CPC .............. *G05D 7/06* (2013.01); *F16K 27/003* (2013.01); *G01F 15/005* (2013.01); *G01F 25/0053* (2013.01); *G06F 3/0484* (2013.01)

(58) Field of Classification Search
CPC .. F16K 27/003; G01F 15/005; G01F 25/0053; G05D 7/06; G06F 3/0484
See application file for complete search history.

(56) References Cited

U.S. PATENT DOCUMENTS 5,988,233 A * 11/1999 Fosnight ........... H01L 21/67393
141/63
8,601,975 B2    12/2013 Shah et al.
(Continued)

FOREIGN PATENT DOCUMENTS

JP    2017-050517 A    3/2017
JP    2017-139274 A    8/2017
(Continued)

OTHER PUBLICATIONS

International Search Report and Written Opinion for the International Application No. PCT/US2019/066372, dated Apr. 10, 2020, 13 pages.

*Primary Examiner* — Chad G Erdman
(74) *Attorney, Agent, or Firm* — Lowenstein Sandler LLP

(57) ABSTRACT

Electronic device manufacturing systems may include an equipment front end module (EFEM) having a load port assembly configured to receiving a substrate carrier, which may be a front opening unified pod (FOUP). The load port assembly may have a receiving plate upon which the substrate carrier may be received. The receiving plate may have a plurality of gas nozzles that can be coupled to purge ports in a bottom of the substrate carrier and to a purge apparatus of the load port assembly. The purge apparatus is configured to provide a gas to the substrate carrier at a selectable gas flow rate and, in some embodiments, to provide a gas to different portions of the substrate carrier each at a selectable gas flow rate. Methods of providing selectable gas flow rates for purging a substrate carrier coupled to a load port assembly are also provided, as are other aspects.

18 Claims, 6 Drawing Sheets

(51) Int. Cl.
   *G01F 25/00* (2006.01)
   *F16K 27/00* (2006.01)
   *G06F 3/0484* (2013.01)

(56) References Cited

U.S. PATENT DOCUMENTS

| | | |
|---|---|---|
| 8,821,098 B2 | 9/2014 | Natsume et al. |
| 9,010,384 B2 | 4/2015 | Yoshimura et al. |
| 9,174,253 B2 | 11/2015 | Natsume et al. |
| 9,508,579 B2 | 11/2016 | Nakano |
| 9,786,531 B2 | 10/2017 | Sasaki et al. |
| 9,824,907 B2 | 11/2017 | Igarashi et al. |
| 2010/0132611 A1* | 6/2010 | Koyama .......... G05B 19/41875 118/696 |
| 2011/0053381 A1* | 3/2011 | Kobayashi .......... H01L 21/3105 438/726 |
| 2013/0213442 A1* | 8/2013 | Kaise ................ H01L 21/67393 134/22.18 |
| 2015/0024671 A1 | 1/2015 | Taniyama et al. |
| 2015/0235885 A1 | 8/2015 | Iwamoto |
| 2016/0118280 A1* | 4/2016 | Wood ................ H01L 21/67109 414/147 |
| 2017/0069516 A1 | 3/2017 | Chen et al. |
| 2017/0178942 A1 | 6/2017 | Sakata et al. |
| 2018/0269095 A1 | 9/2018 | Reuter |
| 2018/0358239 A1* | 12/2018 | Senn ................ H01L 21/67017 |

FOREIGN PATENT DOCUMENTS

| | | | | |
|---|---|---|---|---|
| KR | 2016-0004974 A | * | 1/2016 | ............. H01L 21/02 |
| KR | 10-1638454 B1 | | 7/2016 | |

* cited by examiner

SELECTABLE-RATE BOTTOM PURGE APPARATUS AND METHODS

FIELD

This disclosure relates to electronic device manufacturing and, more particularly, to load port assemblies of equipment front end modules (EFEMs) and to methods of purging substrate carriers.

BACKGROUND

Processing of substrates in semiconductor electronic device manufacturing is carried out in multiple process tools, where substrates travel between process tools in substrate carriers, such as, e.g., front opening unified pods (FOUPs). A substrate carrier may be docked to a load port located at a front of an equipment front end module (EFEM), where one or more substrates may be transferred to a load lock or process chamber coupled to the EFEM. In some embodiments, substrates may be transferred to a transfer chamber of a mainframe through a load lock. The mainframe may have multiple process chambers arranged around the transfer chamber. An environmentally-controlled atmosphere may be provided within and between the substrate carrier and each of the process chambers. Poor control of various environmental factors, such as, e.g., levels of humidity, oxygen, and/or chemical contaminants/particles may adversely affect substrate processing. Thus, existing electronic device manufacturing systems may benefit from improved environmental control of a substrate carrier coupled at a load port assembly of an EFEM.

Accordingly, improved systems, apparatus, and methods of purging a substrate carrier coupled to a load port assembly of an EFEM are desired.

SUMMARY

According to a first aspect, a purge apparatus of a load port assembly of an equipment front end module (EFEM) is provided. The purge apparatus comprises an exhaust gas line having an exhaust inlet connectable to a first gas nozzle of a receiving plate of a load port assembly. The purge apparatus also comprises a delivery gas line having at least one delivery outlet connectable to a second gas nozzle of the receiving plate. The delivery gas line also has first and second parallel branches each coupled to the at least one delivery outlet. The first branch includes a first valve and a first flow control meter, the second branch includes a second valve and a second flow control meter, and each valve is controllable by a controller to open and close a gas flow path there through. The first flow control meter is set to a first gas flow rate at which to deliver a gas through the at least one delivery outlet, and the second flow control meter is set to a second gas flow rate at which to deliver a gas through the at least one delivery outlet, wherein the second gas flow rate is different than the first gas flow rate. The purge apparatus further comprises a graphical user interface (GUI) coupled to the controller, wherein the GUI is configured to receive a selection of the first gas flow rate or the second gas flow rate and to forward the selection to the controller.

According to a second aspect, an EFEM of an electronic device manufacturing system is provided. The EFEM comprises a load port assembly that includes a receiving plate configured to receive a substrate carrier thereon. The receiving plate has a plurality of gas nozzles disposed in the receiving plate, wherein each one of the plurality of gas nozzles is configured for flowing a gas there through. The plurality of gas nozzles is also configured to couple to corresponding ports at a bottom of the substrate carrier. The load port assembly also includes purge apparatus coupled to the plurality of gas nozzles. The purge apparatus comprises an exhaust gas line having an inlet connected to a first nozzle of the plurality of gas nozzles. The purge apparatus also comprises a delivery gas line having at least one delivery outlet connected to a second nozzle of the plurality of gas nozzles. The delivery gas line has a plurality of parallel branches each including a valve and a flow control meter. Each flow control meter is set to a gas flow rate at which to deliver a gas through the at least one delivery outlet, wherein at least a first gas flow rate is different than a second gas flow rate. The EFEM also comprises a GUI and a controller. The GUI is configured to receive a selection of a gas flow rate of one of the flow control meters, and the controller is operative to receive inputs from the GUI and to control an opening and closing of each valve, the controller further operative to respond in real time to the selection of a gas flow rate by opening a valve in a branch associated with the selection and closing valves in branches not associated with the selection.

According to a third aspect, a method of providing selectable gas flow rates to purge a bottom purge substrate carrier coupled at a load port assembly of an EFEM is provided. The method comprises providing purge apparatus that includes an exhaust gas line and a delivery gas line. The exhaust gas line has an exhaust inlet, and the delivery gas line has at least one delivery outlet and first and second parallel branches each coupled to the at least one delivery outlet. The first branch includes a first valve and a first flow control meter, and the second branch includes a second valve and a second flow control meter, each valve controllable by a controller to open and close a gas flow path there through. The first flow control meter is set to a first gas flow rate at which to deliver a gas through the at least one delivery outlet, and the second flow control meter is set to a second gas flow rate at which to deliver a gas through the at least one delivery outlet, wherein the second gas flow rate is different than the first gas flow rate. The method also includes receiving a selection of the first gas flow rate or the second gas flow rate via a GUI, and opening a gas flow path to the at least one delivery outlet in real time through the first branch via the controller opening the first valve and closing the second valve in response to receiving a selection of the first gas flow rate, or through the second branch via the controller closing the first valve and opening the second valve in response to receiving a selection of the second gas flow rate.

Still other aspects, features, and advantages in accordance with these and other embodiments of the disclosure may be readily apparent from the following detailed description, the appended claims, and the accompanying drawings. Accordingly, the drawings and descriptions herein are to be regarded as illustrative in nature, and not as restrictive.

BRIEF DESCRIPTION OF THE DRAWINGS

The drawings, described below, are for illustrative purposes and are not necessarily drawn to scale. The drawings are not intended to limit the scope of the disclosure in any way.

DETAILED DESCRIPTION

Figure 1:
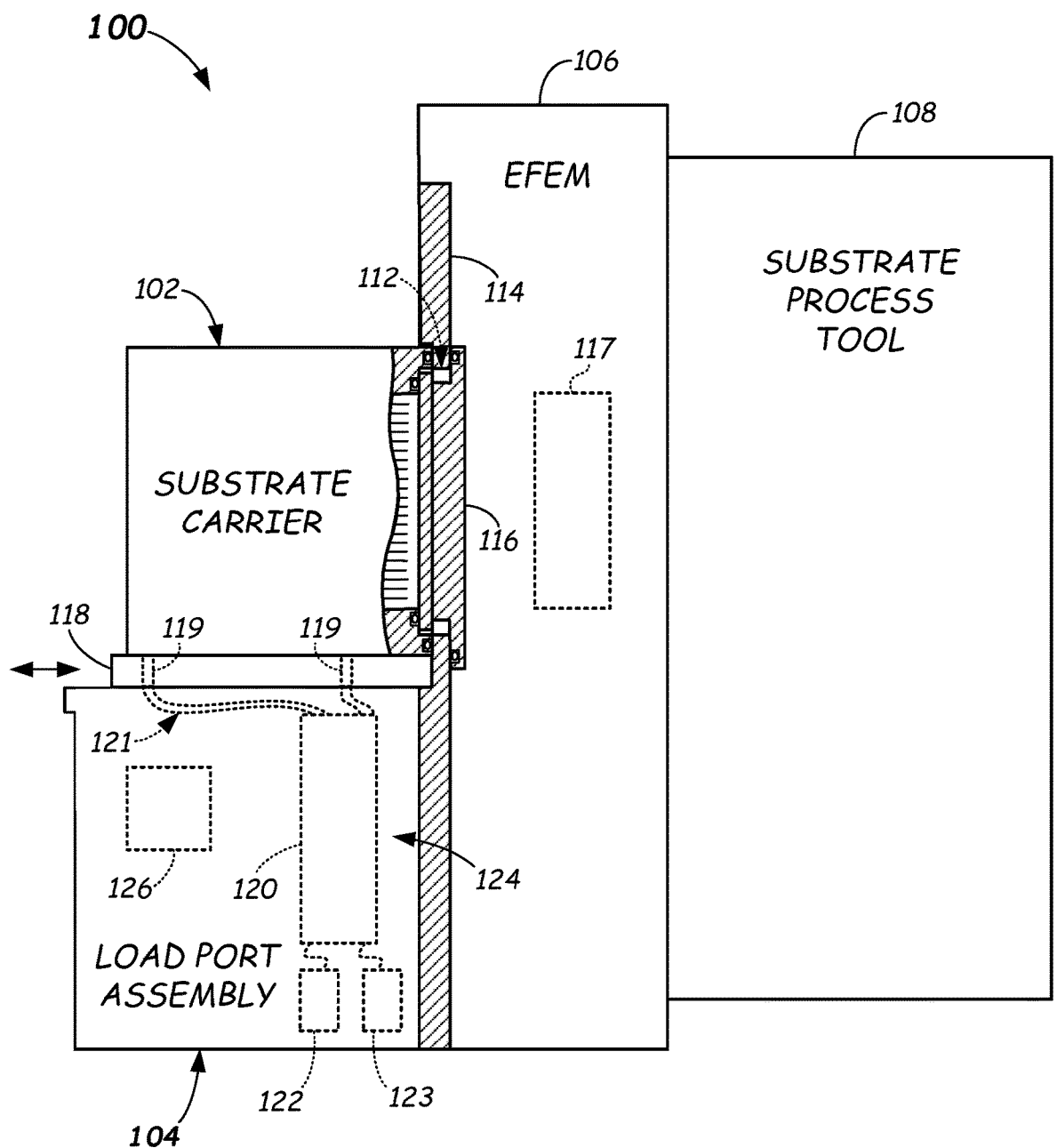
FIG. 1 illustrates a side schematic view of an electronic device manufacturing system according to one or more embodiments of the disclosure.

Reference will now be made in detail to example embodiments of the disclosure, which are illustrated in the accompanying drawings. Wherever possible, the same reference numbers will be used throughout the drawings to refer to the same or like parts. Features of the various embodiments described herein may be combined with each other, unless specifically noted otherwise.

According to one or more embodiments of the disclosure, a bottom purge apparatus of a load port assembly of an equipment front end module (EFEM) in an electronic device manufacturing system is operative to replace a gaseous atmosphere in a substrate carrier docked at the load port, provided the substrate carrier is configured for bottom purging (i.e., has bottom purge ports). The substrate carrier may be, e.g., a front opening unified pod (FOUP). The gaseous atmosphere of the substrate carrier may be replaced with a purge gas, which may be, e.g., nitrogen, another inert gas, or clean dry air (low humidity air). Such substrate carrier purging may significantly reduce or eliminate harmful levels of humidity, oxygen, and/or contaminants/particles that can adversely affect substrate processing.

The purge apparatus provides a purge gas to the substrate carrier at a selectable gas flow rate. Some embodiments may have at least two selectable gas flow rates, which may be selected by a user online via a graphical user interface (GUI). The selection of a gas flow rate may be implemented in real time by a controller receiving inputs from the GUI and then controlling the opening and closing of appropriate valves in the purge apparatus. Real time means immediately or with a slight delay (e.g., a few seconds, for example). The at least two selectable gas flow rates may be a high flow rate (typically, e.g., ≥60 SLM (standard liters per minute)) and a low flow rate (typically, e.g., <60 SLM). The purge apparatus can be configured to provide other selectable gas flow rates, which can be based on process carried out by the electronic device manufacturing system.

Some embodiments may have more than two selectable gas flow rates, and may provide different selectable gas flow rates to different portions of the substrate carrier. For example, in some embodiments, a selectable gas flow rate may be used to provide a purge gas to a front portion of the substrate carrier, while another different selectable gas flow rate may be used to concurrently provide the purge gas to a rear portion of the substrate carrier.

The selection of a gas flow rate may be based on a condition of the substrate carrier or load port, such as, e.g., a substrate carrier filled with substrates having the substrate carrier door open, an empty substrate carrier having the substrate carrier door closed, and/or a load port assembly maintenance mode (e.g., to clean gas nozzles of a receiving plate of the load port assembly prior to receiving a substrate carrier thereon or after a removal of a substrate carrier therefrom.

The purge apparatus may be configured as a modular assembly that can be used with various types of load port assemblies having various gas nozzle configurations in the receiving plate (that correspond to various bottom purge port configurations of various types of bottom purge substrate carriers). For example, the purge apparatus may be operable with either a 2-port or 4-port bottom purge substrate carrier. The modular assembly may be enclosed in a housing that is easily mounted or attached within a lower portion of a load port assembly. The modular assembly may have flexible gas piping inlets and outlets for easily-made connections to gas nozzles of the receiving plate of the load port assembly and to gas sources and exhaust systems (or connections thereof or thereto) accessible within the load port assembly.

The purge apparatus includes a plurality of flow control meters coupled respectively in a plurality of parallel branches of a delivery gas line of the purge apparatus. Each flow control meter functions as a valve to control the gas flow rate through its respective branch. The flow control meters may also be configured to transmit gas flow readings (gas flow rate measurements) to a controller, which can be configured to activate an alarm indicator in a GUI in response to receiving a gas flow rate reading outside of a preset upper flow rate limit and/or lower gas flow rate limit.

The purge apparatus may also be coupled to an EFEM's safety interlock system, wherein the controller can be configured to prevent gas flow through the purge apparatus (by, e.g., closing all plurality of flow control meters in the purge apparatus) in response to the controller receiving inputs from one or more sensors indicating, e.g., an open EFEM door, an EFEM equipment malfunction, and/or an unclamped substrate carrier seated on the receiving plate of the load port assembly.

Further details of example embodiments of purge apparatus used in a load port assembly of EFEMS in an electronic device manufacturing system, as well as other aspects including methods of providing selectable gas flow rates for purging a substrate carrier docked at a load port assembly of an EFEM in an electronic device manufacturing system, are described herein in connection with FIGS. 1-7.

FIG. 1 illustrates a side schematic view of an electronic device manufacturing system 100 in accordance with one or more embodiments. Electronic device manufacturing system 100 may include a substrate carrier 102, a load port assembly 104, an equipment front end module (EFEM) 106, and a substrate process tool 108. Load port assembly 104 may be coupled to EFEM 106, which may be coupled to substrate process tool 108.

Substrate carrier 102 may be configured to carry one or more substrates therein. Substrates may be any suitable article used to make electronic devices or circuit components, such as silicon-containing discs or wafers, patterned wafers, unpatterned wafers, silicon-containing plates, glass plates, or the like. Substrate carrier 102 may be a bottom purge substrate carrier having two or more purge ports (not shown) located therein. In some embodiments, substrate carrier 102 may be, e.g., a front opening unified pod (FOUP). As shown in FIG. 1, substrate carrier 102 may include a carrier door 110 received within a panel opening 112 (a load port) of a panel 114 of load port assembly 104.

Load port assembly 104 may be configured to receive substrate carrier 102 thereon and may include a carrier door opener 116 configured to contact (that is, e.g., latch onto or otherwise attach to) carrier door 110, open carrier door 110, and move the carrier door 110 out of the way to allow the transfer of substrates into and out of substrate carrier 102 through the opening (load port) 112 by a load/unload robot 117 (shown as a dotted box) in the EFEM 106. In some embodiments, carrier door opener 116 may contact carrier door 110, move carrier door 110 inward sufficiently to clear panel 114 (i.e., to right as shown in FIG. 1), and then move carrier door 110 away (e.g., downward) to provide access into substrate carrier 102.

Load port assembly 104 may include a receiving plate 118 configured to receive and clamp a substrate carrier 102 thereon. Receiving plate 118 may have two or more gas nozzles 119 formed on or extending through receiving plate 118 for connection to purge connections or ports (not shown) in the bottom of substrate carrier 102 wherein the two or more gas nozzles 119 are connected to exhaust and delivery gas lines 121 in the load port assembly 104. The term "gas nozzle" as used herein means any structure capable of a detachable connection with the purge ports of the substrate carrier 102 enabling gas flow between exhaust and delivery gas lines 121 and an internal chamber of the substrate carrier 102. Several examples of a "gas nozzle" include a tube or hollow protuberance, a port, a hole, and the like. The gas nozzle engages with a mating purge port formed on the substrate carrier 102, such as a purge connection or port to form a sealed flow connection there between thus producing a sealed gas flow passageway. Any suitable configuration of nozzle and purge port enabling a rapidly coupled and decoupled configuration may be used.

Load port assembly 104 may also include purge apparatus 120 having exhaust and delivery gas lines 121 each connected to a respective gas nozzle 119 for purging a substrate carrier coupled to the Receiving plate 118 of load port assembly 104. Purge apparatus 120 may also have a delivery inlet connected to a gas source 122 (or to a connection to a gas source if the gas source is located outside of load port assembly 104). Purge apparatus 120 may further have an exhaust outlet connected to an exhaust system 123 (or to a connection to an exhaust system if the exhaust system is located outside of load port assembly 104). Purge apparatus 120 may be located in a lower portion 124 of load port assembly 104.

Along with purge apparatus 120, other apparatus (not shown), such as, e.g., vacuum pumps, actuators, sensors, gauges, valves, elevator for the door opener 116, other gas supply lines and sources, and/or the like, may be disposed within and/or coupled to electronic device manufacturing system 100 to provide one or more of substrate carrier 102, load port assembly 104, EFEM 106, and substrate process tool 108 with an environmentally-controlled atmosphere (e.g., in a non-reactive and/or inert gas environment, under vacuum, and the like).

Load port assembly 104 may further include a controller 126 that may control the operation of load port assembly 104 including, e.g., clamping and release of substrate carrier 102 to and from receiving plate 118, motion (e.g., docking and undocking motion) of the receiving plate 118, operation of carrier door opener 116, and operation of purge apparatus 120. Controller 126 may include, e.g., a general purpose computer, a programmable processor, and/or other suitable CPU (central processing unit); a memory for storing processor executable instructions/software programs/firmware; various support circuits (such as, e.g., power supplies, clock circuits, circuits for driving receiving plate 118 and carrier door opener 116, circuits for opening and closing flow control meters and/or other valves in purge apparatus 120, and/or the like); and input/output circuits for communicating through a GUI to permit entry and display of data, operating commands, and the like by a human operator. Controller 126 may operate in conjunction with a system controller (not shown) of electronic device manufacturing system 100. Controller 126 may receive commands from and exchange information with such a system controller. Alternatively, in some embodiments, control of load port assembly 104 (including purge apparatus 120) may be shared by controller 126 and a system controller or, in other embodiments, load port assembly 104 (including purge apparatus 120) may be completely controlled by a system controller of electronic device manufacturing system 100, wherein controller 126 may be omitted from load port assembly 104.

EFEM 106 may be any suitable enclosure having one or more panel openings 112 (load ports) each configured as part of a respective load port assembly 104. EFEM 106 may include a load/unload robot (not shown) configured to transfer substrates from substrate carrier 102 through EFEM 106 to substrate process tool 108.

Substrate process tool 108 may perform one or more processes, such as deposition (e.g., physical vapor deposition (PVD) or chemical vapor deposition (CVD) and the like), etching, annealing, pre-cleaning, heating, degassing, metal or metal oxide removal, and the like, on one or more substrates. Other processes may be carried out on substrates therein. Substrate process tool 108 may include one or more load lock chambers, a transfer chamber, and one or more process chambers (none shown). The one or more load lock chambers may be coupled to EFEM 106, while the transfer chamber may be coupled to the one or more load lock chambers and to the one or more process chambers. The load/unload robot of EFEM 106 may transfer substrates into and out of the one or more load lock chambers, or directly to a process chamber in some embodiments. Substrate process tool 108 may, in some embodiments, include a transfer robot (not shown) at least partially housed within the transfer chamber. The transfer robot may be configured to transfer substrates to and from the one or more load lock chambers and the one or more process chambers.

Figure 2:
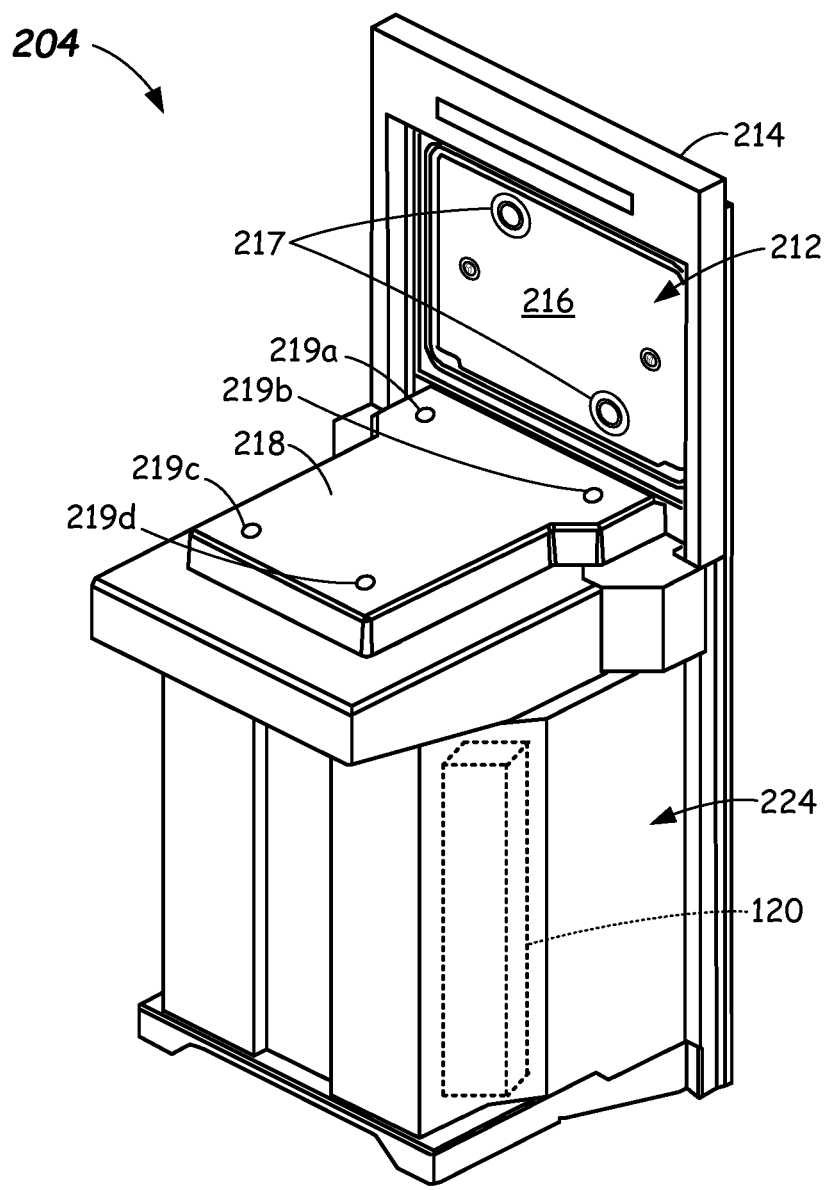
FIG. 2 illustrates a front perspective view of a load port assembly according to one or more embodiments of the disclosure.

FIG. 2 illustrates a front perspective view of a load port assembly 204 in accordance with one or more embodiments. Load port assembly 204 may be identical or similar to load port assembly 104. Load port assembly 204 may include a panel 214 having a panel opening 212 comprising a load port. Load port assembly 204 may also include a carrier door opener 216 that functions to seal panel opening 212 when carrier door opener 216 is closed against panel 214. Carrier door opener 216 may have one or more connectors 217 configured to contact and attach to carrier door 110 (FIG. 1) of substrate carrier 102. Connectors 217 may be, e.g., suction type devices, vacuum devices, mechanical connectors, and the like. Other suitable types of connector devices capable of attaching to carrier door 110 may be used.

Load port assembly 204 may further include a receiving plate 218 that extends horizontally outward from panel 214. Receiving plate 218 may be configured to receive substrate carrier 102 thereon. Various mechanisms (not shown) may be included on, coupled to, and/or around receiving plate 218 to lock or clamp substrate carrier 102 into a docking position on receiving plate 218 and/or to move the receiving plate 218 into sealing engagement with the load port. Receiving plate 218 may include a plurality of gas nozzles 219a-219d. One or more of gas nozzles 219a-219d may be used to supply a gas to substrate carrier 102, and one or more of gas nozzles 219a-219d may be used to exhaust a gas from substrate carrier 102. For example, in some embodiments, gas nozzle 219a may be used to exhaust a gas from substrate carrier 102, while gas nozzles 219b-219d may be used to supply a gas to substrate carrier 102. Other combinations are possible. In some embodiments, only gas nozzles 219a and 219b may be present, wherein gas nozzle 219a may be used to exhaust a gas from substrate carrier 102, and gas nozzle 219b may be used to supply a gas to substrate carrier 102, or vice-versa.

Load port assembly 204 includes a lower portion 224 that may house purge apparatus 120 therein. Purge apparatus 120 may be easily installed in lower portion 224 by, e.g., mounting to a vertical frame member in lower portion 224. Lower portion 224 may also house one or more of the following (none shown): an opening/closing and elevator mechanism coupled to carrier door opener 216, a controller (e.g., controller 126), a gas source (e.g., gas source 122) or a connection thereto, and/or a gas exhaust system (e.g., exhaust system 123) or a connection thereto.

Figure 3:
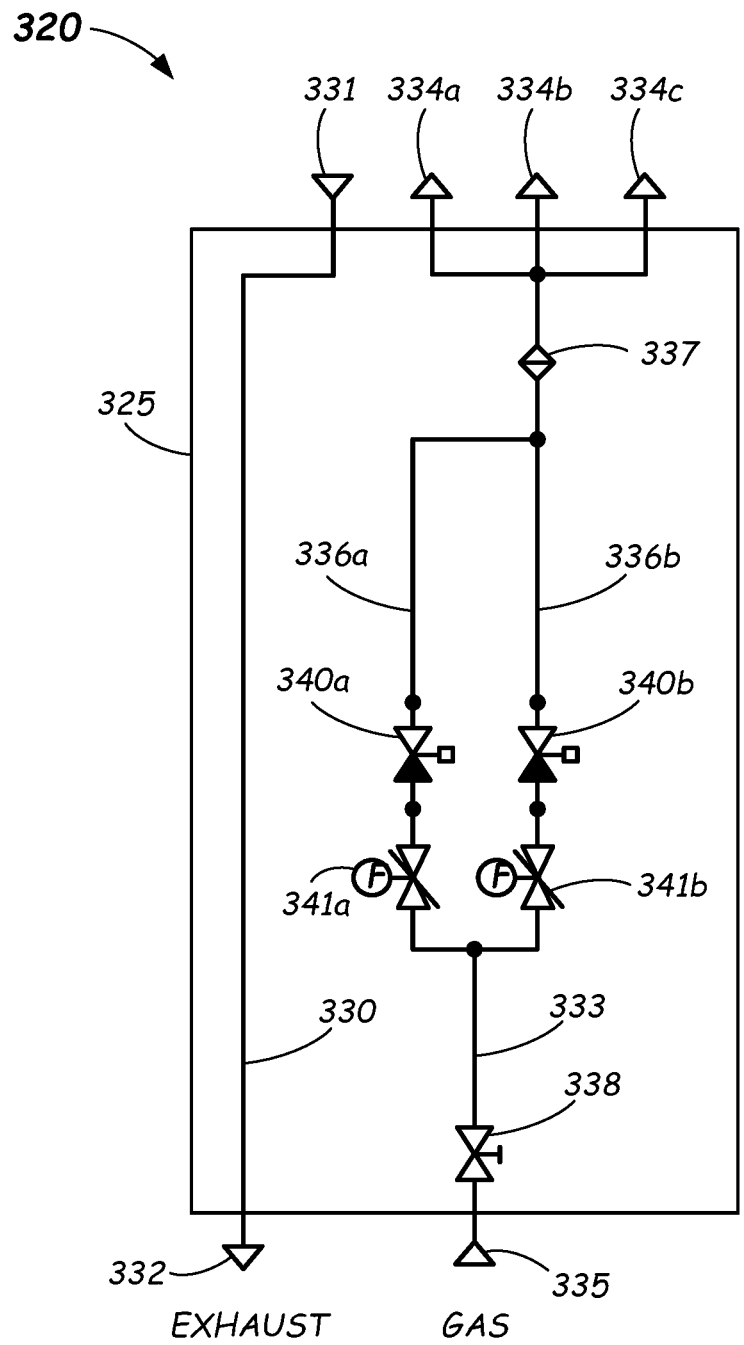
FIG. 3 illustrates a gas flow schematic of purge apparatus of a load port assembly according to one or more embodiments of the disclosure.

FIG. 3 illustrates purge apparatus 320 of a load port assembly 204 in accordance with one or more embodiments. Purge apparatus 320 is an embodiment of purge apparatus 120. Purge apparatus 320 includes an exhaust gas line 330 having an exhaust inlet 331 connectable to a gas nozzle of a receiving plate of a load port, such as, e.g., any one of gas nozzles 219a-d of load port 204 (FIG. 2). Exhaust gas line 330 also has an exhaust outlet 332 connectable to an exhaust system (or connection thereto), such as, e.g., exhaust system 123 of load port assembly 104 (FIG. 1). Purge apparatus 320 also includes a delivery gas line 333 that may have three delivery outlets 334a-334c each connectable to a respective gas nozzle of a receiving plate, such as, e.g., a respective one of gas nozzles 219a-219d of receiving plate 218. Delivery gas line 333 also includes a delivery inlet 335 connectable to a gas source (or connection thereto), such as, e.g., gas source 122 of load port assembly 104. Each of exhaust inlet 331 and delivery outlets 334a-334c may include a length of flexible gas piping (not shown) sufficient to reach and be connected to any gas nozzle on (e.g., a bottom side) of a receiving plate 118 of a load port assembly 104 (as shown, e.g., by the connections of exhaust and delivery gas lines 121 to gas nozzles 119 of FIG. 1). Similarly, exhaust outlet 332 may include a length of flexible gas piping (not shown) sufficient to reach and be connected to an exhaust system (or connection thereto), and delivery inlet 335 may include a length of gas piping (e.g., flexible gas piping—not shown) sufficient to reach and be connected to a gas source (or connection thereto). In those embodiments configured for a 2-port bottom purge substrate carrier, two of delivery outlets 334a-334c may be omitted from purge apparatus 320 or, alternatively, purge apparatus 320 may have a respective valve (not shown) coupled in-line with each of delivery outlets 334a-334c that can be closed for a delivery outlet 334a-334c that is not used. Purge apparatus 320 may further include a modular housing 325 that encloses at least a portion of exhaust gas line 330 and delivery gas line 333 (not including exhaust inlet 331, exhaust outlet 332, delivery outlets 334a-334c, and delivery inlet 335). Modular housing 325 may be configured to be received/mounted within a lower portion (such as, e.g., lower portion 124 or 224) of a load port assembly (e.g., of load port assembly 104, 204).

Delivery gas line 333 includes first and second parallel branches 336a and 336b each coupled to delivery outlets 334a-334c. A filter 337 may be coupled between first and second parallel branches 336a and 336b and delivery outlets 334a-334c, and a manually-operated valve 338 may be coupled between delivery inlet 335 and first and second parallel branches 336a and 336b. First branch 336a can include a first valve 340a and a first flow control meter 341a, and second branch 336b can include a include a second valve 340b and a second flow control meter 341b. Each of first and second valves 340a and 340b may be a pneumatic valve controllable by a controller, such as, e.g., controller 126, to open and close a gas flow path there through. Other types of suitable on-off valves controllable by a controller may be used instead. First flow meter 341a may be set to a first gas flow rate at which to deliver a gas at a first flow rate through each of delivery outlets 334a-334c, and second flow control meter 341b may be set to a second gas flow rate at which to deliver a gas through delivery outlets 334a-334c at a second flow rate. In some embodiments, the second gas flow rate is different than the first gas flow rate. In some embodiments, first flow control meter 341a may have a maximum gas flow rate setting of 100 SLM, and second flow control meter 341b may have a maximum gas flow rate setting of 200 SLM, wherein each may have a 2% flow accuracy at full scale, for example. First and second flow control meters 341a and 341b may have other maximum gas flow rate settings and flow accuracies. First and second flow control meters 341a and 341b are also each configured to transmit flow rate readings to a controller (such as, e.g., controller 126), as described in more detail below in connection with FIG. 5. First and second flow control meters 341a and 341b may each be, e.g., a PFM series Digital Flow Switch by SMC Corporation of America. Other suitable flow control meters may be used.

Exhaust gas line 330 and delivery gas line 333 may each be any type of suitable clean room compatible gas line capable of flowing gases there through under atmospheric and/or vacuum pressures as dictated by the EFEM and/or the electronic device manufacturing system at which the load port assembly 104, 204 containing purge apparatus 320 is installed. More particularly, exhaust gas line 330 and delivery gas line 333 may be, e.g., a clean room compatible polyolefin tube.

Figure 4:
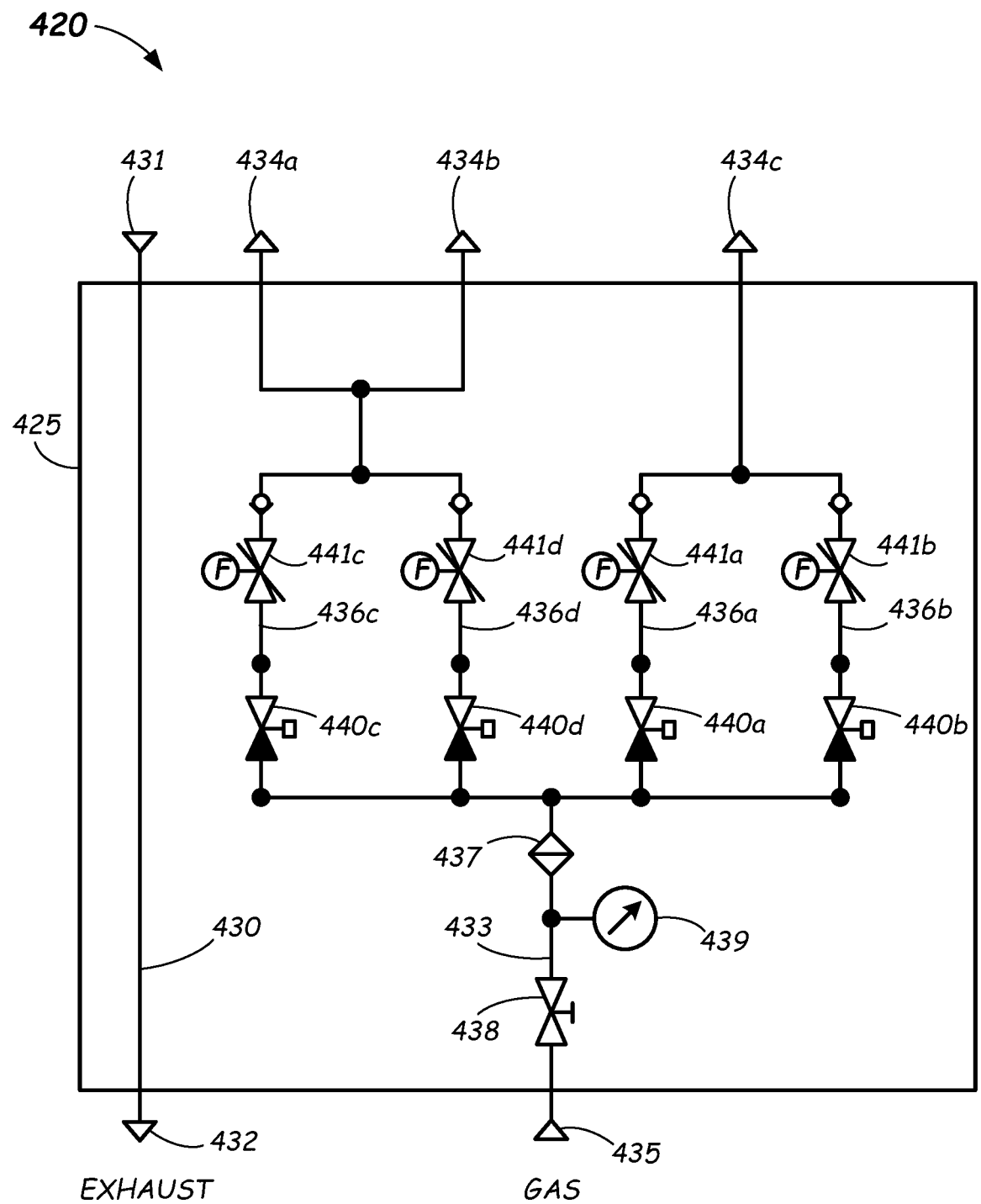
FIG. 4 illustrates a gas flow schematic of another purge apparatus of a load port assembly according to one or more embodiments of the disclosure.

FIG. 4 illustrates an alternative purge apparatus 420 for a load port assembly of an EFEM in accordance with one or more embodiments. Purge apparatus 420 is another embodiment of purge apparatus 120. Purge apparatus 420 includes an exhaust gas line 430 having an exhaust inlet 431 connectable to a gas nozzle of a receiving plate of a load port assembly, such as, e.g., any one of gas nozzles 219a-219d of load port assembly 204 (FIG. 2). Exhaust gas line 430 also has an exhaust outlet 432 connectable to an exhaust system (or connection thereto), such as, e.g., exhaust system 123 of load port assembly 104 (FIG. 1). Purge apparatus 420 also includes a delivery gas line 433 that may have three delivery outlets 434a-434c each connectable to a respective gas nozzle of a receiving plate, such as, e.g., a respective one of gas nozzles 219a-219d. Delivery gas line 433 also has a delivery inlet 435 connectable to a gas source (or connection thereto), such as, e.g., gas source 122 of load port assembly 104. Each of exhaust inlet 431 and delivery outlets 434a-434c may include a length of flexible gas piping (not shown) sufficient to reach and be connected to any gas nozzle on (e.g., a bottom side of) a receiving plate of a load port assembly (as shown, e.g., by the connections of exhaust and delivery gas lines 121 to gas nozzles 119 of FIG. 1).

Similarly, exhaust outlet 432 may include a length of flexible gas piping (not shown) sufficient to reach and be connected to an exhaust system (or connection thereto), and delivery inlet 435 may include a length of gas piping (not shown—e.g., flexible gas piping)) sufficient to reach and be connected to a gas source (or connection thereto). Exhaust gas line 430 and delivery gas line 433 may each be any type of suitable clean room compatible gas line capable of flowing gases there through under atmospheric and/or vacuum pressures as dictated by the EFEM and/or the electronic device manufacturing system at which the load port assembly containing purge apparatus 420 is installed. More particularly, exhaust gas line 430 and delivery gas line 433 may be, e.g., a clean room compatible polyolefin tube.

In some embodiments, exhaust inlet 431 and delivery outlet 334c may be connected to respective gas nozzles located toward a front of the receiving plate (i.e., gas nozzles closest to panel 114 or 214 of load port assemblies 104 or 204, respectively, such as, e.g., gas nozzles 219a and 219b), while delivery outlets 434a and 434b may be connected to respective gas nozzles located toward a rear of the receiving plate (such as, e.g., gas nozzles 219c and 219d). As described further below, this allows purge apparatus 420 to provide a purge gas at a first gas flow rate to a front portion of a substrate carrier coupled to receiving plate 218 and at a second (different or the same) gas flow rate to a rear portion of the substrate carrier (e.g., substrate carrier 102).

In those embodiments configured for a 2-port bottom purge substrate carrier, purge apparatus 420 may have a respective valve (not shown) coupled in-line with each of delivery outlets 434a-434c that can be closed for one or more delivery outlets 434a-434c that are not used.

Purge apparatus 420 may further include a modular housing 425 that encloses at least a portion of exhaust gas line 430 and delivery gas line 433 (not including exhaust inlet 431, exhaust outlet 432, delivery outlets 434a-c, and delivery inlet 435). Modular housing 425 may be configured to be received/mounted within a lower portion (such as, e.g., lower portion 124 or 224) of a load port assembly in an identical or similar manner as modular housing 325 of purge apparatus 320.

Delivery gas line 433 includes first and second parallel branches 436a and 436b each coupled to delivery outlet 434c. First branch 436a includes a first valve 440a and a first flow control meter 441a, and second branch 436b includes a second valve 440b and a second flow control meter 441b. Each of first and second valves 440a and 440b may be a pneumatic valve controllable by a controller, such as, e.g., controller 126, to open and close a gas flow path there through. Other types of suitable on-off valves controllable by a controller may be used instead. First flow control meter 441a may be set to a first gas flow rate at which to deliver a gas through delivery outlet 434c at a first flow rate, and second flow control meter 441b may be set to a second gas flow rate at which to deliver a gas through delivery outlet 434c at a second flow rate. In some embodiments, the second gas flow rate is different than the first gas flow rate. In some embodiments, first flow control meter 441a may have a maximum gas flow rate setting of 100 SLM, and second flow control meter 441b may have a maximum gas flow rate setting of 50 SLM, wherein each may have a 2% flow accuracy at full scale, for example. First and second flow control meters 441a and 441b may have other maximum gas flow rate settings and flow accuracies.

Delivery gas line 433 can also include third and fourth parallel branches 436c and 436d each coupled to delivery outlets 434a and 434b. Third branch 436c includes a third valve 440c and a third flow control meter 441c, and fourth branch 436d includes a fourth valve 440d and a fourth flow control meter 441d. Each of third and fourth valves 440c and 440d may be a pneumatic valve controllable by a controller, such as, e.g., controller 126, to open and close a gas flow path there through. Other types of suitable on-off capable valves controllable by a controller may be used instead. Third flow control meter 441c may be set to a third gas flow rate at which to deliver a gas through each of delivery outlets 434a and 434b at the third gas flow rate, and fourth flow control meter 441d may be set to a fourth gas flow rate at which to deliver a gas through each of delivery outlets 434a and 434b at the fourth gas flow rate. In some embodiments, the fourth gas flow rate is different than the third gas flow rate. In some embodiments, third flow control meter 441c may have a maximum gas flow rate setting of 200 SLM, and fourth flow control meter 441d may have a maximum gas flow rate setting of 100 SLM, wherein each may have a 2% flow accuracy at full scale, for example. Third and fourth flow control meters 441c and 441d may have other maximum gas flow rate settings and flow accuracies.

First, second, third, and fourth flow control meters 441a-441d can each be configured to transmit flow readings to a controller (such as, e.g., controller 126), as described below in connection with FIG. 6. First, second, third, and fourth flow control meters 441a-441d may each be, e.g., a PFM series Digital Flow Switch by SMC Corporation of America. Other suitable flow control meters may be used.

Purge apparatus 420 may include a filter 437, a manually-operated valve 438, and a pressure/vacuum meter 439 coupled between delivery inlet 435 and first, second, third, and fourth parallel branches 436a-436d.

Figure 5:
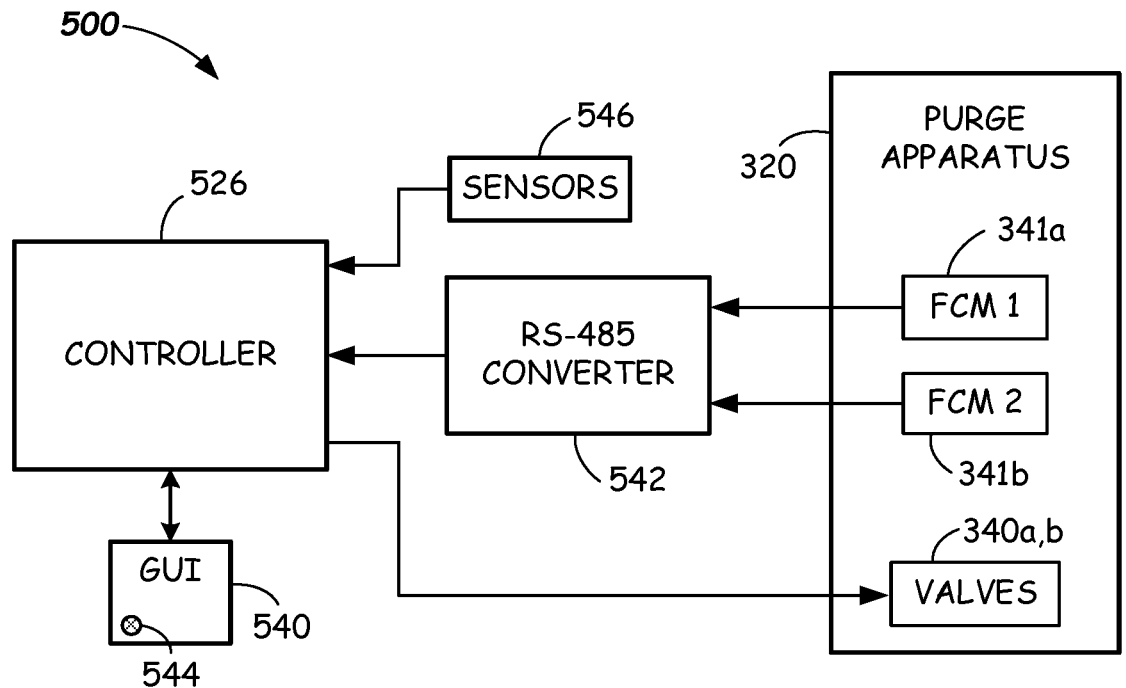
FIG. 5 illustrates a schematic block diagram of data/command transfers between the purge apparatus of FIG. 3, a graphical user interface (GUI), and a controller according to one or more embodiments of the disclosure.

FIG. 5 illustrates a data/command transfer structural configuration 500 between a controller 526, a GUI 540, an RS-485 converter 542, a plurality of sensors 546, and purge apparatus 320 of FIG. 3 in accordance with one or more embodiments. Controller 526 may be identical or similar to controller 126. Analog flow rate readings from first and second flow control meters 341a and 341b may be transmitted (either wirelessly or via a wired connection) to RS-485 converter 542, which is coupled to controller 526, for displaying the flow rate readings to a user via GUI 540. Conversion to electrical standards other than RS-485 may be possible in some embodiments. GUI 540 may be coupled to controller 526 and/or may be included in any suitable computer device, such as, e.g., controller 526, a system controller in communication with controller 526, a handheld device in communication with controller 526, etc. In some embodiments, GUI 540 may comprise an alarm indicator 544, wherein controller 526 may be operative to activate alarm indicator 544, which may include visual and/or audio indicators, in response to receiving a flow rate reading from purge apparatus 320 that is outside of preset upper limit and/or lower limit.

GUI 540 may be configured to receive from a user a selection of a first gas flow rate (at which first flow control meter 341a is set) or a second gas flow rate (at which second flow control meter 341b is set) and to forward the selection to controller 526. Controller 526 may, in real time, respond to the selection of the first or second gas flow rate by opening one of first and second valves 340a or 340b in the branch associated with the selection and closing the other of first and second valves 340a or 340b in the branch not associated with the selection. Controller 526 may also be responsive to programmed instructions (executing on controller 526, a system controller, or elsewhere) requiring a switch from one gas flow rate to the other at which to flow a gas through purge apparatus 320.

In some embodiments, controller 526 may be operative to close both first and second valves 340a or 340b of purge apparatus 320 in response to receiving one or more inputs from one or more sensors 546 indicating, e.g., an open EFEM door, an EFEM equipment malfunction, an unclamped substrate carrier 102 seated on the receiving plate 118 or 218, or any other condition that would be desirable for purge gas to stop flowing through purge apparatus 320.

Figure 6:
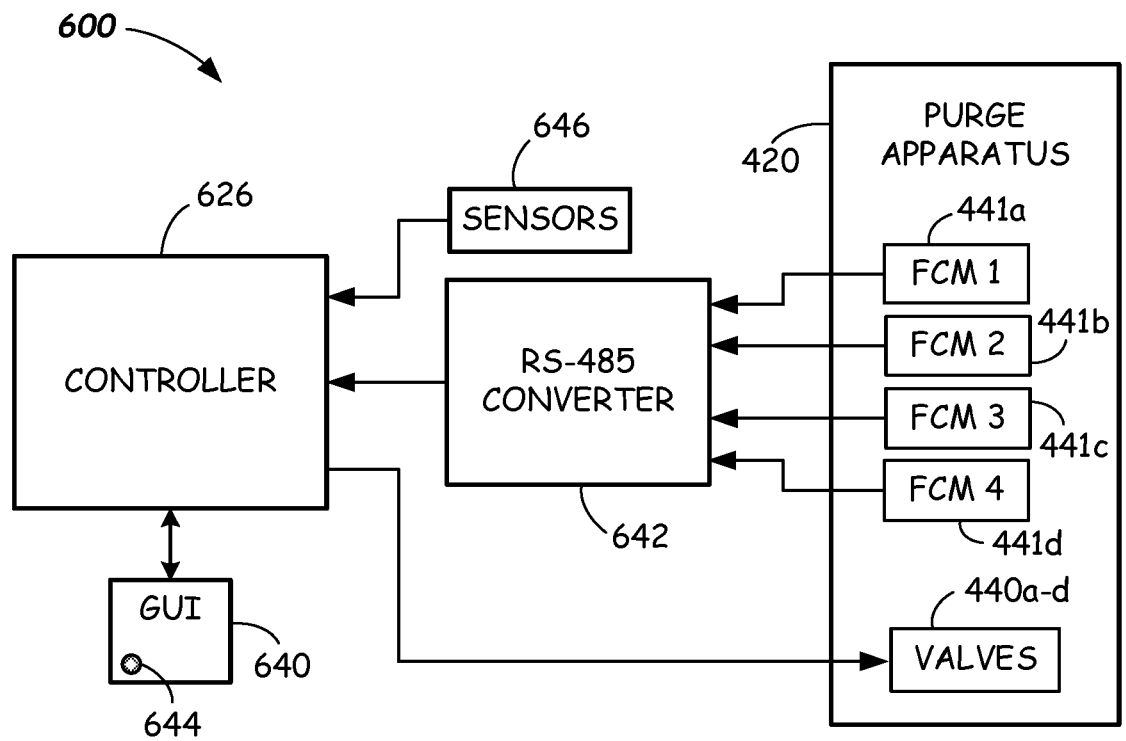
FIG. 6 illustrates a schematic block diagram of data/command transfers between the purge apparatus of FIG. 4, a GUI, and a controller according to one or more embodiments of the disclosure.

FIG. 6 illustrates a data/command transfer configuration 600 between a controller 626, a GUI 640, an RS-485 converter 642, a plurality of sensors 646, and purge apparatus 420 of FIG. 4 in accordance with one or more embodiments. Controller 626 may be identical or similar to controller 126 and/or controller 526. Analog flow rate readings from flow control meters 441a-d may be transmitted (either wirelessly or via a wired connection) to RS-485 converter 642, which is coupled to controller 626, for displaying the flow rate readings to a user via GUI 640. Conversion to electrical standards other than RS-485 may be possible in some embodiments. GUI 640 may be coupled to controller 626 and/or may be included in any suitable computer device, such as, e.g., controller 626, a system controller in communication with controller 626, a handheld device in communication with controller 626, etc. In some embodiments, GUI 640 may include an alarm indicator 644, wherein controller 626 may be operative to activate alarm indicator 644, which may include visual and/or audio indicators, in response to receiving a flow rate reading from purge apparatus 420 that is outside of preset upper limit and/or lower limit.

GUI 640 may be configured to receive from a user a first selection of a first gas flow rate (at which first flow control meter 441a is set) or a second gas flow rate (at which second flow control meter 441b is set) and to forward the first selection to controller 626. Additionally, GUI 640 may be configured to receive from a user a second selection of a third gas flow rate (at which third flow control meter 441c is set) or a fourth gas flow rate (at which fourth flow control meter 441d is set) and to forward the second selection to controller 626. Controller 626 may, in real time, respond to the first selection by opening one of first and second valves 440a and 440b in the first or second branch 436a or 436b associated with the first selection and closing the other of first and second valves 440a and 440b in the first or second branch 436a or 436b not associated with the first selection. Controller 626 also may, in real time, respond to the second selection by opening one of third and fourth valves 440c and 440d in the third or fourth branch 436c or 436d associated with the second selection and closing the other of third and fourth valves 440c and 440d in the third or fourth branch 436c or 436d not associated with the second selection. Controller 626 may also be responsive to programmed instructions (executing on controller 626, a system controller, or elsewhere) requiring a switching of one or both of the two gas flow rates at which to flow a gas through purge apparatus 420 (i.e., the gas flow rate through delivery outlet 434c via first branch 436a or second branch 436b and/or the gas flow rate through delivery outlets 434a and 434b via third branch 436c or fourth branch 436d).

In some embodiments, controller 626 may be operative to close all valves 440a-440d of purge apparatus 420 in response to receiving one or more inputs from one or more sensors 646 indicating, e.g., an open EFEM door, an EFEM equipment malfunction, an unclamped substrate carrier 102 seated on the receiving plate 118 or 218, or any other condition that would involve purge gas to stop flowing through purge apparatus 420.

Figure 7:
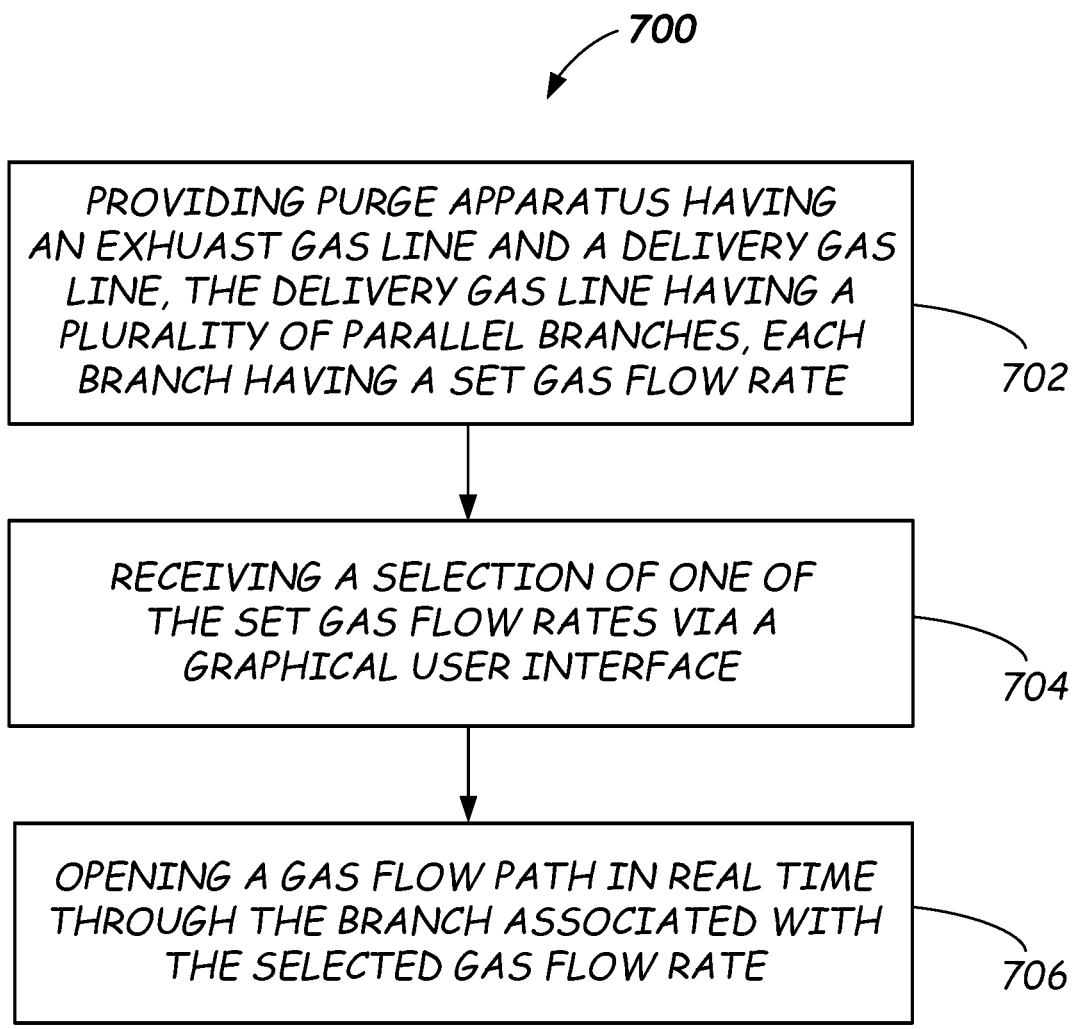
FIG. 7 illustrates a flowchart of a method of providing selectable gas flow rates to purge a substrate carrier coupled to a load port assembly of an equipment front end module in an electronic device manufacturing system according to one or more embodiments of the disclosure.

FIG. 7 illustrates a method 700 of providing selectable gas flow rates for purging a substrate carrier at a load port assembly of an EFEM in an electronic device manufacturing system in accordance with one or more embodiments. At process block 702, method 700 may include providing purge apparatus having an exhaust gas line and a delivery gas line, wherein the delivery gas line has a plurality of parallel branches, each branch having a set gas flow rate. More particularly, the delivery gas line may have at least one delivery outlet and first and second parallel branches each coupled to the at least one delivery outlet. The first branch may include a first valve and a first flow control meter, the second branch may include a second valve and a second flow control meter, wherein each valve is controllable by a controller to open and close a gas flow path there through. The first flow control meter may be set to a first gas flow rate at which to deliver a gas through the at least one delivery outlet, and the second flow control meter may be set to a second gas flow rate at which to deliver a gas through the at least one delivery outlet, wherein the second gas flow rate is different than the first gas flow rate. See, e.g., FIG. 3, first and second branches 336a and 336b, and FIG. 4, first and second branches 436a and 436b.

In some embodiments, method 700 may also include at process block 702 providing the purge apparatus such that the delivery gas line further has at least a second delivery outlet and third and fourth parallel branches each coupled to the at least a second delivery outlet. The third branch may include a third valve and a third flow control meter, the fourth branch may include a fourth valve and a fourth flow control meter, wherein each valve is controllable by the controller to open and close a gas flow path there through. The third flow control meter may be set at a third gas flow rate at which to deliver a gas through the at least a second delivery outlet, and the fourth flow control meter may be set at a fourth gas flow rate at which to deliver a gas through the at least a second delivery outlet, wherein the fourth gas flow rate is different than the third gas flow rate. See, e.g., FIG. 4, third and fourth branches 436c and 436d and delivery outlets 434a and 434b.

At process block 704, method 700 may include receiving a selection of one of the set gas flow rates via a GUI. More particularly, method 700 may include at process block 704 receiving a selection of the first gas flow rate or the second gas flow rate via the GUI. For example, the GUI may be GUI 540 or 640 (of FIGS. 5 and 6, respectively) each of which is configured to receive a selection of a gas flow rate set at first or second branches 336a/436a or 336b/436b. In some embodiments, method 700 may also include at process block 704 receiving a selection of a third gas flow rate or a fourth gas flow rate via the GUI. For example, GUI 640 of FIG. 6 is further configured to receive a selection of a gas flow rate set at third or fourth branches 436c and 436d.

And at process block 706, method 700 may include opening a gas flow path in real time through the branch associated with the selected gas flow rate. More particularly, method 700 may include at process block 706 opening a gas flow path to the at least one delivery outlet in real time through the first branch via the controller opening the first valve and closing the second valve in response to receiving a selection of the first gas flow rate, or through the second branch via the controller closing the first valve and opening the second valve in response to the receiving a selection of the second gas flow rate. See, e.g., FIG. 3, first and second valves 340a and 340b, and FIG. 4, first and second valves 440a and 440b.

In some embodiments, method 700 may also include at process block 706 opening a gas flow path to at least a second delivery outlet in real time through a third branch via the controller opening a third valve and closing a fourth valve in response to receiving a selection of a third gas flow rate, or through a fourth branch via the controller closing the third valve and opening the fourth valve in response to receiving a selection of a fourth gas flow rate. See, e.g., FIG. 4, delivery outlets 434a and 434b, third and fourth branches 436c and 436d, and third and fourth valves 440c and 440d.

In some embodiments, method 700 may further include connecting the exhaust inlet of the purge apparatus to a first gas nozzle of a receiving plate of the load port assembly, connecting the at least one delivery outlet of the purge apparatus to a second gas nozzle of the receiving plate, the second gas nozzle located at or toward a front of the receiving plate, and connecting the at least a second delivery outlet to a third gas nozzle of the receiving plate, the third gas nozzle located at or toward a rear of the receiving plate. For example, referring to FIGS. 2 and 3, exhaust inlet 331 may be connected to gas nozzle 219a, delivery outlet 334a may be connected to gas nozzle 219c, delivery outlet 334b may be connected to gas nozzle 219d, and delivery outlet 334c may be connected to gas nozzle 219b. Similarly, referring to FIGS. 2 and 4, exhaust inlet 431 may be connected to gas nozzle 219a, delivery outlet 434a may be connected to gas nozzle 219c, delivery outlet 434b may be connected to gas nozzle 219d, and delivery outlet 434c may be connected to gas nozzle 219b. Other connections schemes are possible.

The foregoing description discloses example embodiments of the disclosure. Modifications of the above-disclosed apparatus, systems, and methods which fall within the scope of the disclosure should be readily apparent to those of ordinary skill in the art. Accordingly, while the present disclosure has been disclosed in connection with example embodiments, it should be understood that other embodiments may fall within the scope of the disclosure, as defined by the claims.

What is claimed is:

1. A purge apparatus of a load port assembly of an equipment front end module, comprising:
a modular housing configured to be received within a lower portion of the load port assembly, the modular housing comprising:
an exhaust gas line having an exhaust inlet connectable to a first gas nozzle of a receiving plate of a load port assembly; and
a delivery gas line comprising a first delivery outlet connectable to a second gas nozzle of the receiving plate, the delivery gas line further having first and second parallel branches each coupled to the first delivery outlet, the first branch including a first valve and a first flow control meter, the second branch including a second valve and a second flow control meter, each valve controllable by a controller to open and close a gas flow path there through, the first flow control meter set to a first gas flow rate at which to deliver a gas through the first delivery outlet, and the second flow control meter set to a second gas flow rate at which to deliver a gas through the first delivery outlet, the second gas flow rate different than the first gas flow rate.

2. The purge apparatus of claim 1, wherein the first delivery outlet comprises three delivery outlets each connectable to a respective gas nozzle of the receiving plate, the first branch coupled to each of the three delivery outlets, and the second branch coupled to each of the three delivery outlets.

3. The purge apparatus of claim 1, wherein the first and second flow control meters are each configured to transmit flow readings to the controller.

4. The purge apparatus of claim 1, wherein the exhaust gas line has an exhaust outlet connectable to an exhaust system, and the delivery gas line has a delivery inlet connectable to a gas source.

5. The purge apparatus of claim 1, wherein:
the delivery gas line further comprises:
a second delivery outlet;
a third branch coupled to the second delivery outlet and including a third flow control meter set at a third gas flow rate at which to deliver a gas through the second delivery outlet; and
a fourth branch coupled to the second delivery outlet and including a fourth flow control meter set at a fourth gas flow rate at which to deliver a gas through the second delivery outlet, the fourth gas flow rate different than the third gas flow rate.

6. The purge apparatus of claim 5, further comprising a third delivery outlet, wherein the second delivery outlet is connectable to a third gas nozzle of the receiving plate and the third delivery outlet is connectable to a fourth gas nozzle of the receiving plate, and wherein each of the third branch and the fourth branch is coupled to each of the second delivery outlet and the third delivery outlet.

7. The purge apparatus of claim 1, further comprising:
a graphical user interface (GUI) coupled to the controller, the GUI configured to receive a selection of the first gas flow rate or the second gas flow rate and to forward the selection to the controller.

8. An equipment front end module (EFEM) of an electronic device manufacturing system, the EFEM comprising:
a load port assembly, comprising:
a receiving plate configured to receive a substrate carrier thereon, the receiving plate having a plurality of gas nozzles disposed in the receiving plate, each one of the plurality of gas nozzles configured for flowing a gas there through, the plurality of gas nozzles further configured to couple to corresponding ports at a bottom of the substrate carrier; and
a purge apparatus coupled to the plurality of gas nozzles, the purge apparatus comprising:
an exhaust gas line having an inlet connected to a first nozzle of the plurality of gas nozzles, and
a delivery gas line comprising:
a first delivery outlet connected to a second nozzle of the plurality of gas nozzles, the second nozzle delivering the gas, to a first portion of the substrate carrier, at a gas flow rate that is selectable from a first gas flow rate and a second gas flow rate, the first gas flow rate being different than the second gas flow rate;
a first and a second parallel branches each coupled to the first delivery outlet, the first branch including a first valve and a first flow control meter, the second branch including a second valve and a second flow control meter;
a second delivery outlet connected to a third gas nozzle of the plurality of gas nozzles, the third gas nozzle delivering the gas, to a second portion of the substrate carrier, at the gas flow rate that is selectable from a third gas flow rate and a fourth gas flow rate, the third gas flow rate being different than the first gas flow rate and the second gas flow rate, wherein the second portion of the substrate carrier is different from the first portion of the substrate carrier; and a third and a fourth parallel branches each coupled to the second delivery outlet, the third branch including a third valve and a third flow control meter, the fourth branch including a fourth valve and a fourth flow control meter.

9. The EFEM of claim 8, wherein the purge apparatus further comprises a modular housing configured to be received within a lower portion of the load port assembly, the modular housing comprising the exhaust gas line and the delivery gas line.

10. The EFEM of claim 8, further comprising:
a graphical user interface (GUI) configured to receive a selection of a gas flow rate of at least one of the first flow control meter, the second flow control meter, or the third flow control meter; and
a controller operative to receive inputs from the GUI and to control an opening and closing of each valve, the controller further operative to respond in real time to the selection of a gas flow rate by opening a valve in a branch associated with the selection and closing valves in branches not associated with the selection of the gas flow rate.

11. The EFEM of claim 10, wherein each flow control meter is configured to transmit flow readings to the controller, and the controller is operative to activate an alarm indicator in the GUI in response to receiving a flow reading outside of a preset limit.

12. The EFEM of claim 8, further comprising a controller configured to close all valves of the purge apparatus in response to receiving sensor inputs of an open EFEM door, an EFEM equipment failure, or an unclamped substrate carrier seated on the receiving plate.

13. A method of providing selectable gas flow rates for purging a bottom purge substrate carrier docked at a load port assembly of an equipment front end module, the method comprising:
providing purge apparatus comprising a modular housing configured to be received within a lower portion of the load port assembly, the modular housing comprising:
an exhaust gas line and a delivery gas line, the exhaust gas line having an exhaust inlet, the delivery gas line comprising a first delivery outlet and first and second parallel branches each coupled to the first delivery outlet, the first branch including a first valve and a first flow control meter, the second branch including a second valve and a second flow control meter, each valve controllable by a controller to open and close a gas flow path there through, the first flow control meter set to a first gas flow rate at which to deliver a gas through the first delivery outlet, and the second flow control meter set to a second gas flow rate at which to deliver a gas through the first delivery outlet, the second gas flow rate different than the first gas flow rate.

14. The method of claim 13, further comprising:
connecting the exhaust inlet to a first gas nozzle of a receiving plate of the load port assembly; and
connecting the first delivery outlet to a second gas nozzle of the receiving plate.

15. The method of claim 13, further comprising:
providing the purge apparatus such that the delivery gas line further comprises a second delivery outlet and third and fourth parallel branches each coupled to the second delivery outlet, the third branch including a third valve and a third flow control meter, the fourth branch including a fourth valve and a fourth flow control meter, each valve controllable by the controller to open and close a gas flow path there through, the third flow control meter set at a third gas flow rate at which to deliver a gas through the second delivery outlet, and the fourth flow control meter set at a fourth gas flow rate at which to deliver a gas through the second delivery outlet, the fourth gas flow rate different than the third gas flow rate.

16. The method of claim 15, further comprising:
connecting the exhaust inlet to a first gas nozzle of a receiving plate of the load port assembly;
connecting the first delivery outlet to a second gas nozzle of the receiving plate, the second gas nozzle located toward a front of the receiving plate; and
connecting the second delivery outlet to a third gas nozzle of the receiving plate, the third gas nozzle located toward a rear of the receiving plate.

17. The method of claim 13, wherein the exhaust gas line has an exhaust outlet and the delivery gas line has a delivery inlet, the method further comprising:
connecting the exhaust outlet to an exhaust system; and
connecting the delivery inlet to a gas source.

18. The method of claim 13, further comprising:
receiving a selection of the first gas flow rate or the second gas flow rate via a graphical user interface (GUI); and
opening a gas flow path to the first delivery outlet in real time through:
the first branch via the controller opening the first valve and closing the second valve in response to receiving the selection of the first gas flow rate, or
the second branch via the controller closing the first valve and opening the second valve in response to the receiving a selection of the second gas flow rate.

* * * * *